(12) United States Patent
Chen et al.

(10) Patent No.: US 7,594,165 B2
(45) Date of Patent: Sep. 22, 2009

(54) EMBEDDED AD HOC BROWSER WEB TO SPREADSHEET CONVERSION CONTROL

(75) Inventors: Yen-Fu Chen, Austin, TX (US); John Hans Handy-Bosma, Cedar Park, TX (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 268 days.

(21) Appl. No.: 11/032,847

(22) Filed: Jan. 11, 2005

(65) Prior Publication Data

US 2006/0156221 A1 Jul. 13, 2006

(51) Int. Cl.
*G06F 17/00* (2006.01)

(52) U.S. Cl. .................. 715/212; 715/227; 715/239
(58) Field of Classification Search ............... 715/500, 715/769, 856, 862, 212, 217, 221
See application file for complete search history.

(56) References Cited

U.S. PATENT DOCUMENTS

| | | | | |
|---|---|---|---|---|
| 5,881,381 A * | 3/1999 | Yamashita et al. | ......... | 715/209 |
| 5,983,268 A * | 11/1999 | Freivald et al. | ............ | 709/218 |
| 6,055,327 A | 4/2000 | Aragon | ...................... | 382/138 |
| 6,374,273 B1 | 4/2002 | Webster | ...................... | 707/513 |
| 6,389,437 B2 * | 5/2002 | Stoub | ......................... | 715/523 |
| 6,691,281 B1 * | 2/2004 | Sorge et al. | ................. | 715/503 |
| 6,701,485 B1 * | 3/2004 | Igra et al. | .................. | 715/210 |
| 6,868,528 B2 * | 3/2005 | Roberts | ..................... | 715/853 |
| 7,237,186 B2 * | 6/2007 | Androski et al. | ............ | 715/217 |
| 7,350,141 B2 * | 3/2008 | Kotler et al. | ................. | 715/209 |
| 2002/0036662 A1 * | 3/2002 | Gauthier et al. | ............ | 345/835 |
| 2002/0178183 A1 * | 11/2002 | Meding | ..................... | 707/509 |
| 2004/0167906 A1 * | 8/2004 | Smith et al. | ................. | 707/100 |
| 2004/0172592 A1 * | 9/2004 | Collie et al. | ................ | 715/503 |
| 2004/0205521 A1 * | 10/2004 | Geuss et al. | ................ | 715/503 |
| 2004/0205644 A1 * | 10/2004 | Shaughnessy et al. | ....... | 715/530 |
| 2004/0210822 A1 * | 10/2004 | Kotler et al. | ................ | 715/500 |

* cited by examiner

*Primary Examiner*—Boris Pesin
(74) *Attorney, Agent, or Firm*—Yee & Associates, P.C.; William H. Steinberg; Rudolf O. Siegesmund

(57) ABSTRACT

A table converter is disclosed that enables a user to convert any table, or portion of a table, displayed on a web page to a spreadsheet control embedded in the webpage. The table converter is a web browser plug-in or feature comprising a table analysis program (TAP); a table conversion program (TCP), a spreadsheet configuration program (SCP), a spreadsheet modification program (SMP), a configurable table engine (CTE), and a configurable table template (CTT). The CTE contains a rules database. The TAP interrogates the highlighted hypertext markup language (HTML) table structure <table>, <tr>, <th> and <td> tags, and text for delimiters. The TCP maps the table headings and data to a configurable table engine (CTE). The CTE inserts the headings and data into a configurable table template (CTT), and displays the CTT on the web page at a user configurable location. The SCP enables a user to automate the process, to add or subtract columns or rows from the table, and to add calculation functions. Automation options include both locating and converting a table displayed on a web page.

1 Claim, 4 Drawing Sheets

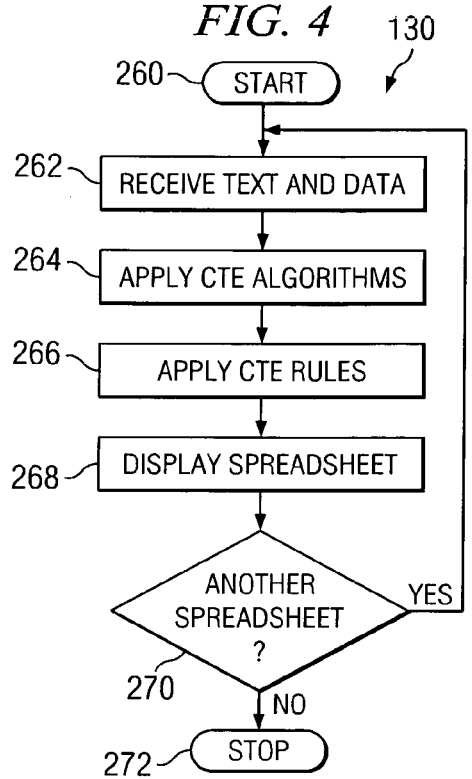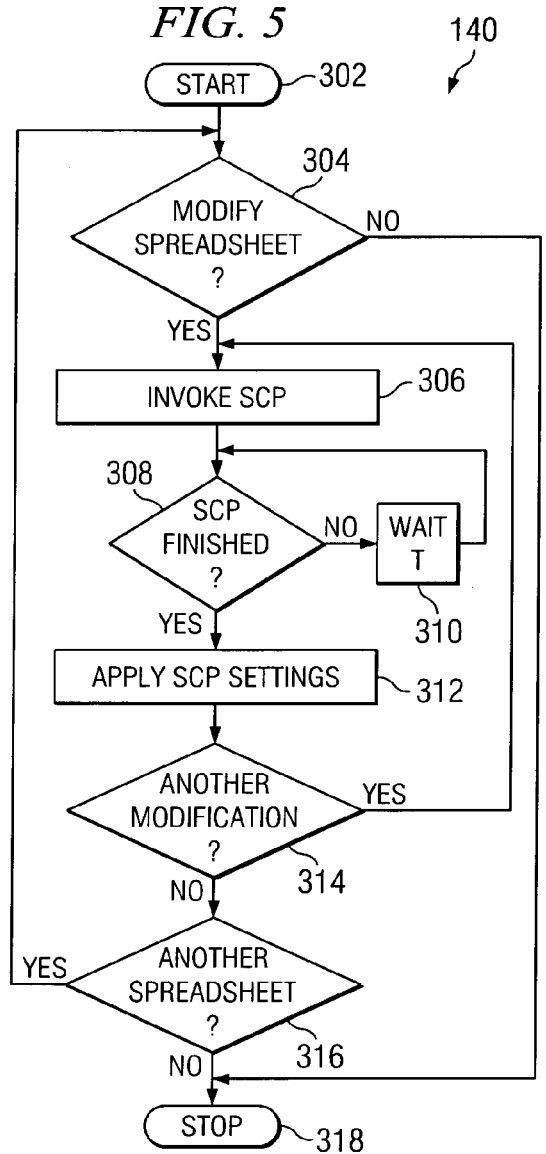

EMBEDDED AD HOC BROWSER WEB TO SPREADSHEET CONVERSION CONTROL

CROSS-REFERENCE TO RELATED APPLICATION

The present invention is related to the subject matter of U.S. patent application Ser. No. 10/922,244 and U.S. patent application Ser. No. 10/922,269, incorporated herein by reference.

FIELD OF THE INVENTION

This invention relates generally to computer implemented data processing in general, and more particularly, to a program for selecting and converting a HTML table appearing on a web page into a spreadsheet control object.

BACKGROUND OF THE INVENTION

Digital information displayed on the Internet may be found on web pages viewed through a web browser. A web page is an HTML file containing both text and a set of hyper-text markup language (HTML) tags that describe how the text should be formatted when the web browser displays the web page on a user's display screen. A web browser is a computer program that goes to a web server on the Internet, requests the web page, and retrieves the page so that a user can view HTML documents and access files and programs related to those HTML documents. A web server is a program that uses HTTP to provide HTML documents and files and programs related to those documents when requested by a web browser. The web browser then interprets the HTML tags within the page and displays the page.

The HTML tags direct the browser as to how the web page should look when it is displayed. The browser interprets these tags to determine the format of the text on the screen. The tags can instruct the browser to change fonts, color, and arrange text in tables. Currently, one of the most widely used HTML tools for arranged web pages is a table. Tables are created with the tag, <table>. A horizontal row in a table begins with the tag <tr>, and each piece of data within the horizontal row begins with the tag <td> and <th>. The width of rows and columns, the height of rows and columns, the heading spacing, and the cell spacing in a table can be controlled.

Embedding spreadsheet controls in a web page using technology such as ActiveX is known. However, converting portions of a table, or entire tables from a web page into an operational spread sheet at the user's disecretion is not known. The prior embedding is controlled by the page developer, and cannot be modified by a user, either remotely or locally. This is because the developer provides embedded instructions linking the table to an actual .xls spreadsheet file that is downloaded by ActiveX. What is needed beyond the prior art is a program for user-controlled local conversion of a table in a web page to a functional and configurable spreadsheet. Such a program should provide functions so that a user would be able to add a row to the new spreadsheet, and insert fields that calculate sums, averages, means and so on, for the numbers in the rows and columns. What is further needed is a configurable program for table conversion so that a user could set conditional formatting (for example, showing all negative numbers in red and within parentheses).

A present method for creating a spreadsheet from a table is to manually copy the data and paste it into a spreadsheet such as Microsoft Excel®. However, the prior art does not disclose automation of this process to a configurable spreadsheet template. What is needed is a program to take any table, or portion of a table, displayed on a web page and to convert the table to a configurable spreadsheet template with operational capabilities similar to Microsoft Excel®. Such a capability, if automated, would allow a consistent look and functionality to the converted tables. Indeed, a user would not need a spreadsheet program such as Microsoft Excel®.

In U.S. patent application Ser. No. 10/922,244, applicants disclosed a web browser plug-in or feature comprising a modification program, a configuration program, a sorting program, algorithms, and rules, that interacted with a web browser to analyze a web page for tables and inserted controls. The analysis consisted of interrogating incoming hypertext markup language (HTML) for table structure <table>, <tr>, <th> and <td> tags, and incoming text for delimiters. The analysis further consisted of marking all <th>, <td>, and <tr> tags as potentially sortable, and all delimiters for table columns or rows as potentially sortable. The analysis concluded by determining whether the marked tags and/or marked delimeters met a criteria for being sortable. Next, the configuration program introduced controls into the text for each column and row delimeter that met the criteria for being sortable. In addition, the configuration program introduced controls into the HTML for each column and row tag that met the criteria for being sortable. The configuration program linked the controls to a sorting algorithm so that when activated, the appropriate sorting algorithm acted on the row or column associated with the control. The controls were injected before the web browser rendered the web page. When the web browser rendered the web page, the web browser recognized and interpreted the injected HTML code so that the table could be sorted by the sorting program.

In U.S. patent application Ser. No. 10/922,269, applicants disclosed a web browser plug-in or feature comprising a modification program, a configuration program, a table reduction program, algorithms, and rules, that interacted with a web browser to analyze a web page for tables. The analysis consisted of interrogating incoming hypertext markup language (HTML) for table structure <table>, <tr>, <th> and <td> tags, and incoming text for delimiters. The analysis further consisted of marking all <th>, <td>, and <tr> tags as potentially hideable, and all delimiters for table columns or rows as potentially hideable. If there were two or more contiguous <th> or <td> tags they were marked as hideable. If there were two or more contiguous <tr> tags, all were marked as hideable since the rows could represent the headers. The analysis concluded by determining whether the marked tags and/or marked delimeters met a criteria for being hideable. Next, the configuration program introduced controls into the text for each column and row delimeter that met the criteria for being hideable. In addition, the configuration program introduced controls into the HTML for each column and row tag that met the criteria for being hideable. The configuration program linked the controls to a hiding algorithm so that when activated, the appropriate hiding algorithm would act on the row or column associated with the control. The controls were injected before the web browser rendered the web page. When the web browser rendered the web page, the web browser recognized and interpreted the injected HTML code so that the table could be reduced by the table reduction program.

While the above disclosures provided a way for a user to sort or hide table columns and rows, they did not allow a user to apply all of the operations available in a spread sheet control program. For example, they did not allow a user to add a row, or to insert a sum or average function to operate on a column of numbers. Therefore, a need exists for a program that will allow a user to convert any HTML table on any web page into a spreadsheet control object so that the data in the table can be viewed and manipulated within the browser window's embedded spreadsheet control without copying and pasting into an existing spreadsheet program.

SUMMARY OF THE INVENTION

The invention that meets the needs identified above is a table converter that enables a user to convert any table, or portion of a table, displayed on a web page to a spreadsheet control embedded in the webpage. The table converter is a web browser plug-in or feature comprising a table analysis program (TAP), a table conversion program (TCP), a spreadsheet configuration program (SCP), a spreadsheet modification program (SMP), a configurable table engine (CTE), and a configurable table template (CTT). The CTE contains a rules database. The TAP interrogates the highlighted hypertext markup language (HTML) table structure <table>, <tr>, <th> and <td> tags, and text for delimeters. The TCP maps the table headings and data to a configurable table engine (CTE). The CTE inserts the headings and data into a configurable table template (CTT), and displays the CTT on the web page at a user configurable location. The SCP enables a user to automate the process, to add or subtract columns or rows from the table, and to add calculation functions. Automation options include both locating and converting a table displayed on a web page.

BRIEF DESCRIPTION OF DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a flowchart of the Table Conversion Program (TCP).

FIG. 5 is a flowchart of the Spreadsheet Modification Program (SMP).

DETAILED DESCRIPTION OF THE PREFERRED EMBODIMENT

A person of ordinary skill in the art will appreciate that the present invention may be implemented in a variety of software and hardware configurations. It is believed, however, that the invention is described best as a computer program that configures and enables one or more general-purpose computers to implement the novel aspects of the invention.

As used herein, "computer" means a machine having a processor, a memory, and an operating system, capable of interaction with a user or other computer, and shall include without limitation desktop computers, notebook computers, tablet computers, personal digital assistants (PDAs), servers, handheld computers, and similar devices.

As used herein, "control" means an object on a screen that, when activated by a user, performs an action.

As used herein, "delimeter" means a character used to indicate the beginning and end of a character string.

As used herein, "screen" means a user display device upon which a page may be displayed.

As used herein, "tag" means a code identifying an element in a document so that information in the document may be formatted, indexed and linked As used herein "web browser" means a program that enables a user to access a web page or other HTML document, file, and program related to the web page or other HTML document.

As used herein, "web page" means a Hypertext Markup Language (HTML) file including graphics and/or script in a unique directory identifiable by a uniform resource locator.

As used herein, "wizard" means a utility within an application that interacts with a user in order to guide the user through completion of each step of a task.

Figure 1:
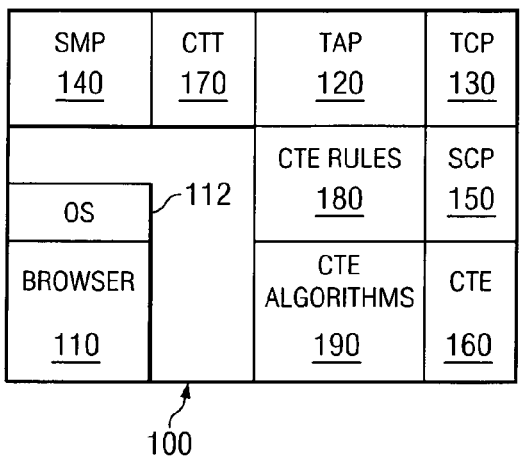
FIG. 1 is a diagram illustrating one embodiment of the internal configuration of a computer.

The internal configuration of a computer, including connection and orientation of the processor, memory, and input/output devices, is well known in the art. FIG. 1 represents the internal configuration of a computer having the computer program of the present invention loaded into memory 100. The table converter of the present invention is depicted as a web browser plug-in or feature comprising table analysis program (TAP) 120, table conversion program (TCP) 130, spreadsheet modification program (SMP) 140, spreadsheet configuration program (SCP) 150, configurable table engine (CTE) 160, and configurable table template (CTT) 170. Memory 100 further contains CTE rules database 180 and CTE algorithms database 190. Memory 100 also contains browser 110. Memory 100 is only illustrative of memory within a computer, storage within a computer and of storage connected to a computer and is not meant as a limitation.

The computer is connected to one or more input devices and a display, a user can selectively view the data that is managed by the table converter. The input device may be a keyboard, mouse, rollerball, tackpad, pen, touch screen and stylus, or voice recognition system. The input device may also be a touch screen associated with the display. Together these elements may be embodied as a variety of computing devices such as a personal digital assistant, cellular telephone, notebook computer, and so forth. In alternative embodiments, the table converter and its components can be stored in the memory of other computers.

Figure 2:
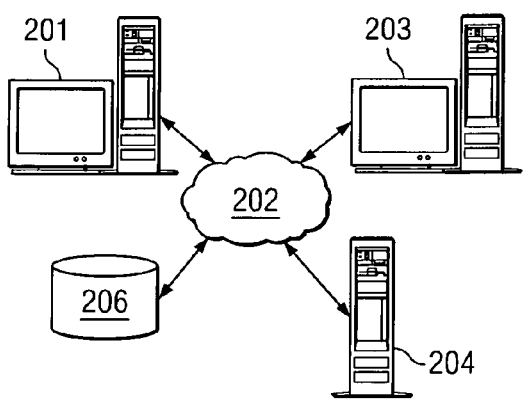
FIG. 2 illustrates an architecture for connecting various hardware devices to create a network for transferring data.

FIG. 2 illustrates a common prior art architecture for connecting various hardware devices to create a network for transferring data. Computer network 200 comprises local workstation 201 electrically coupled to network connection 202. In FIG. 2, local workstation 201 is coupled electrically to remote workstation 203 via network connection 202. Local workstation 201 also is coupled electrically to server 204 and persistent storage 206 via network connection 202. Network connection 202 may be a simple local area network (LAN) or may be a larger wide area network (WAN), such as the Internet. While computer network 200 depicted in FIG. 2 is intended to represent a possible network architecture, it is not intended to represent an architectural limitation.

Figure 3:
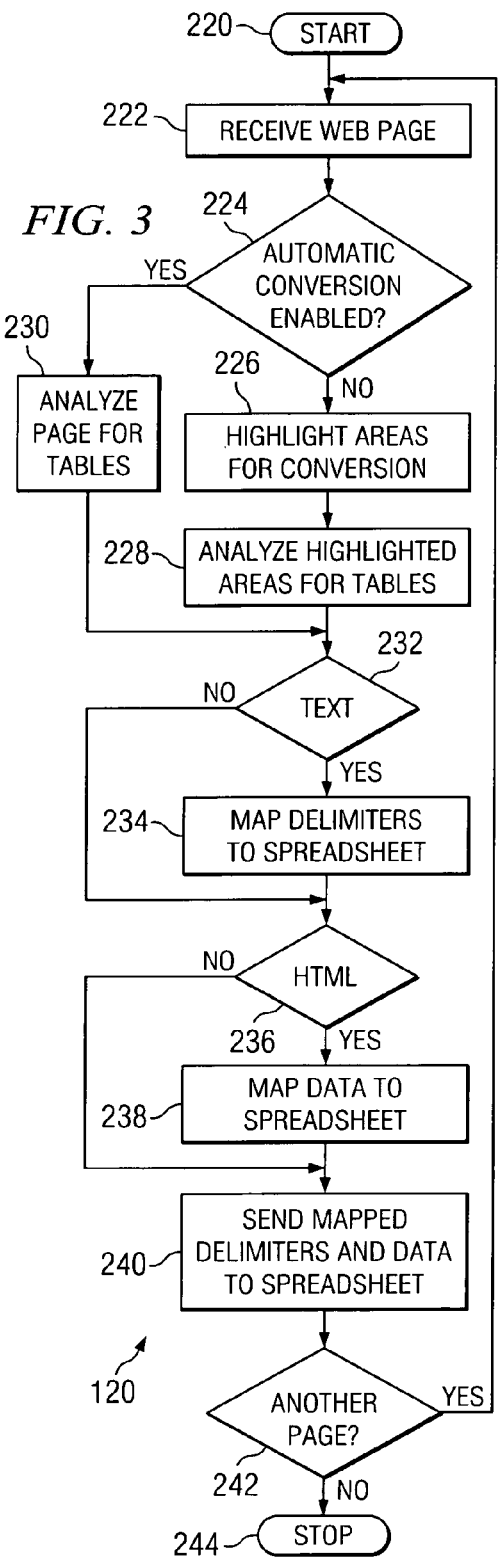
FIG. 3 is a flowchart of the Table Analysis Program (TAP).

FIG. 3 depicts the logic of Table Analysis Program (TAP). TAP 120 starts (220) and receives a web page (222). A determination is made whether automatic conversion has been enabled (224). If so, TAP 120 analyzes the page for tables (230) and goes to step 232. If not, the user highlights areas for conversion (226), and TAP 120 analyzes the highlighted areas for table (228). If text is present (232), TAP 120 maps delimiters to the spreadsheet (234). If HTML is present, the HTML data is mapped to the spreadsheet. The mapped delimiters and data are sent to the spreadsheet (240). If another page is to be analyzed, TAP 120 goes to step 222, and if not, TAP 120 stops (244).

FIG. 4 depicts the logic of Table Conversion Program (TCP). TCP (130) starts (260). The text and data from steps 234 and 238 of FIG. 3 are received (262). TCP 130 applies CTE algorithms (264) and applies CTE rules (266). TCP 130 displays the spreadsheet (268). If another spreadsheet is to be converted (270), TCP 130 goes to step 262. If not, TCP 130 stops (272).

FIG. 5 depicts the logic of Spreadsheet Modification Program (SMP). SMP (140) starts (302). If the user desires to modify a spreadsheet (304), SMP 140 invokes Spreadsheet Configuration Program (SCP) 150 (304). If SCP 150 is finished (308), the SCP settings are applied (312). If there is another modification, SMP 140 goes to step 306. If there is another spreadsheet, SMP 140 goes to step 304; otherwise SMP 140 stops (318).

Figure 6:
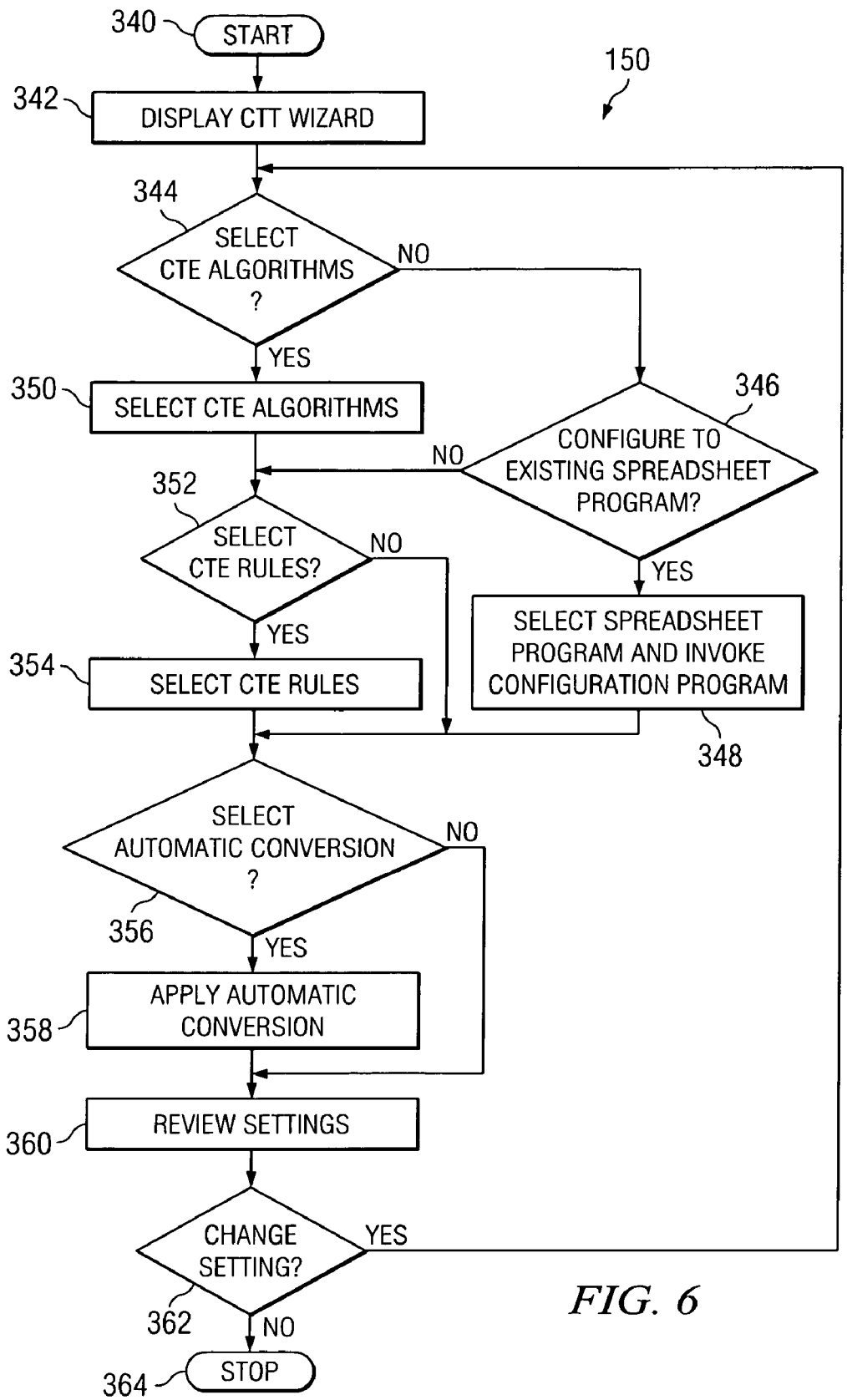
FIG. 6 is a flowchart of the Spreadsheet Configuration Program (SCP).

FIG. 6 depicts the logic of Spreadsheet Configuration Program (SCP) 150. SCP 150 starts (340) and displays the configurable template table (CTT) wizard (342). If the user wants to select algorithms for the configuration template table (344), then the user will make the selections (350). If not, SCP 150 determines whether the user wants to configure the existing spreadsheet program (346). If the user does not want to configure the existing spreadsheet program, SCP 150 determines whether the user wants to select CTE rules (352). If so, the user selects CTE rules (354). If the user does not want to select CTE rules, SCP 150 goes to step 356. If at step 346, the user wants to configure an existing spreadsheet program, then the user selects the spreadsheet program and invokes the Spreadsheet Configuration Program (348). SCP 150 determines whether the user wants to select automatic conversion (356). If so, automatic conversion is applied, and if not, SCP 150 displays settings for the user's review (360). If the user wants to change a setting (362), SCP 150 goes to step 344, and if not, SCP 150 stops (364).

Figure 7:
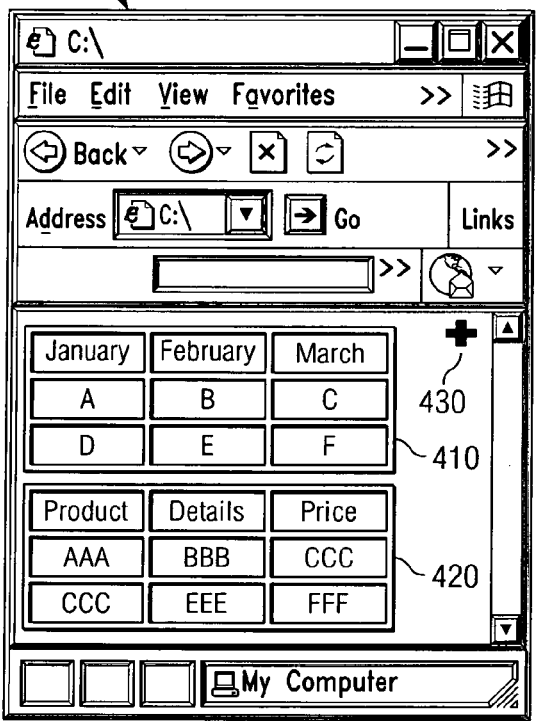
FIG. 7 depicts a two spreadsheets on a web page.
Figure 9:
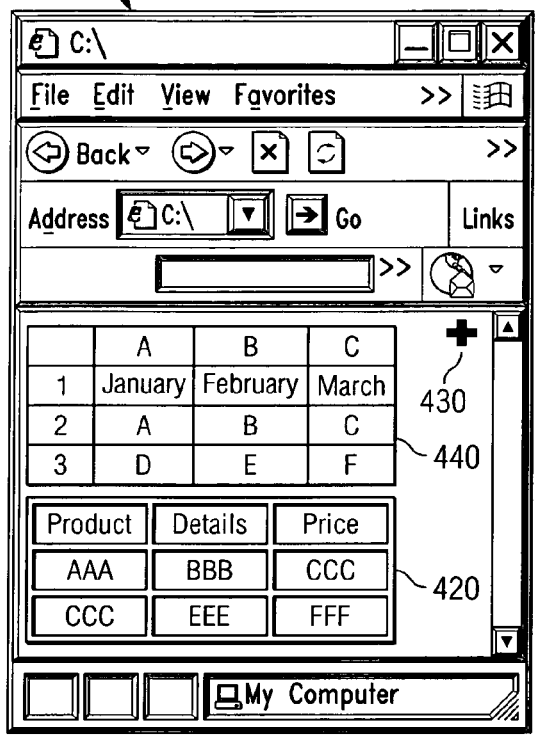
FIG. 9 depicts the highlighted spreadsheet of FIG. 8 after conversion.
Figure 8:
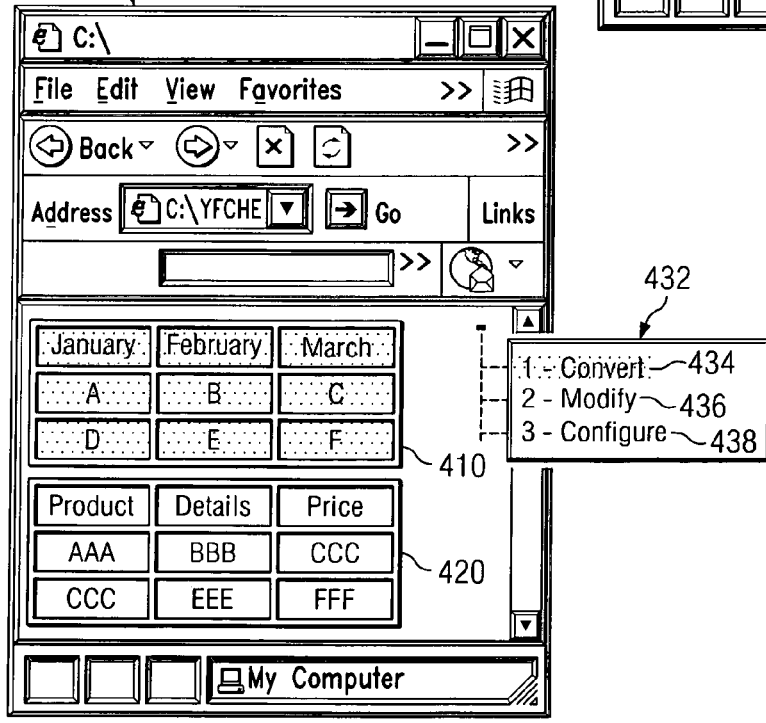
FIG. 8 depicts the two spreadsheets of FIG. 7 with one highlighted spreadsheet and a highlighted selection from a drop down menu.

FIG. 7 through FIG. 8 depict a table conversion. In FIG. 7, first table 410 and second table 420 on web page 400. Web page 400 has table conversion button 430. In order to activate table conversion button 430, the user highlights a table, such as first table 410 as shown in FIG. 8, and activates table conversion button 430 by clicking on it or passing the mouse cursor over it. Activation of table conversion button 430 will deploy option menu 432. In this instance, the options presented are convert 434, modify 436 or configure 438. In FIG. 8, the user has activated control 430 to display drop down menu 432. The user selected option 1, Convert 434. FIG. 9 displays a converted table 440 presented in place of first table 410 of FIG. 8.

Persons skilled in the art are aware that the web browser plug-in of the present invention may be configured as a stand alone application with a flowing window.

Persons skilled in the art are aware that preferences may be shared by developers and among users to reduce the amount of configuration required by users. For example, a developer may include default configuration specific to popular sites.

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A computer implemented method in a data processing system, which includes a processor, for using a web browser to convert an entire HTML table in a web page to a spreadsheet in the web page, the method comprising:

receiving, by a table analysis program that is being executed by the processor, the web page, wherein the web page includes the entire HTML table, and further wherein the entire HTML table includes a plurality of table headings and a plurality of pieces of data, and still further wherein each piece of said plurality of pieces of data is preceded by an HTML tag;

displaying the entire HTML table in the web page in a web browser window;

analyzing the web page for tables in response to receiving the web page, wherein the entire HTML table is found as a result of the analysis of the web page;

after finding the entire HTML table, converting the entire HTML table to a spreadsheet by mapping the plurality of table headings and the plurality of pieces of data to a spreadsheet template, wherein converting the entire HTML table to the spreadsheet occurs only as a result of the receipt of the web page;

displaying the spreadsheet in the web page browser window, wherein the spreadsheet in the web page replaces the entire HTML table in the web page; and providing a web browser plug-in that includes the table analysis program, a table conversion program, a spreadsheet modification program, a spreadsheet configuration program, a configuration table engine, and a configurable table template.

\* \* \* \* \*